United States Patent [19]

Owen

[11] 4,149,295

[45] Apr. 17, 1979

[54] DOOR RETURN APPARATUS

[76] Inventor: Lloyd W. Owen, 181-6 Maybury Cir., Waterbury, Conn. 06706

[21] Appl. No.: 856,131

[22] Filed: Nov. 30, 1977

[51] Int. Cl.$^2$ .................... A22C 29/00

[52] U.S. Cl. .................... 16/72; 16/76

[58] Field of Search .................... 16/49, 71, 72, 76, 75, 16/85, 80; 49/386

[56] References Cited

U.S. PATENT DOCUMENTS

| | | | |
|---|---|---|---|
| 1,010,071 | 11/1911 | Potter | 16/72 |
| 1,106,640 | 8/1914 | Eccleston | 16/72 |
| 1,232,340 | 7/1917 | Lehson | 16/72 UX |
| 1,593,724 | 7/1926 | Schenk | 16/76 |
| 1,861,888 | 6/1932 | Stevens | 16/75 |
| 1,983,999 | 12/1934 | Seyforth | 16/49 X |

FOREIGN PATENT DOCUMENTS

| | | | |
|---|---|---|---|
| 712161 | 7/1954 | United Kingdom | 49/386 |

*Primary Examiner*—Ronald Feldbaum
*Attorney, Agent, or Firm*—DeLio and Montgomery

[57] ABSTRACT

Apparatus for automatically returning a door hinged in a doorway. The apparatus includes an arm extending from the door and an elongated resilient member engaging the arm and having both ends anchored to the doorway. When the door is opened, the resilient member is extended. When the door is released, the resilient member urges the door to return closed.

8 Claims, 8 Drawing Figures

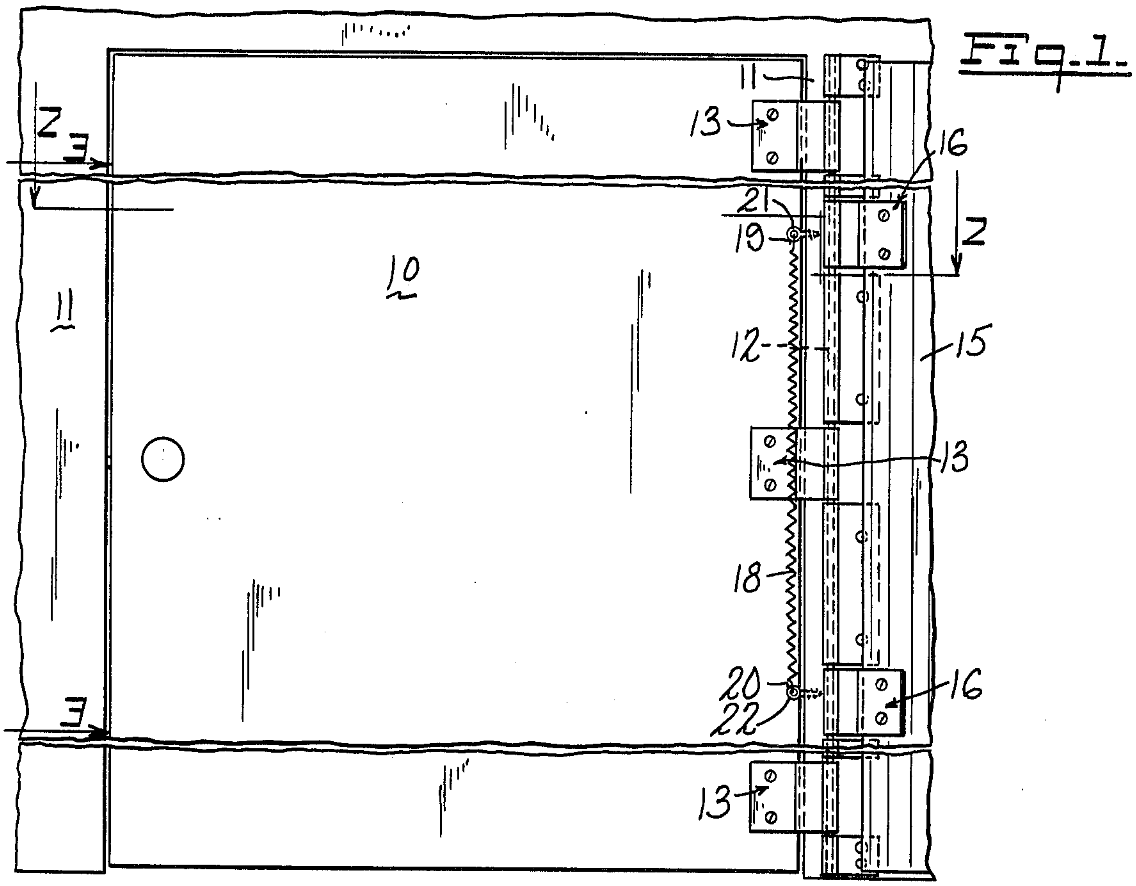
Fig. 1.
Fig. 2.
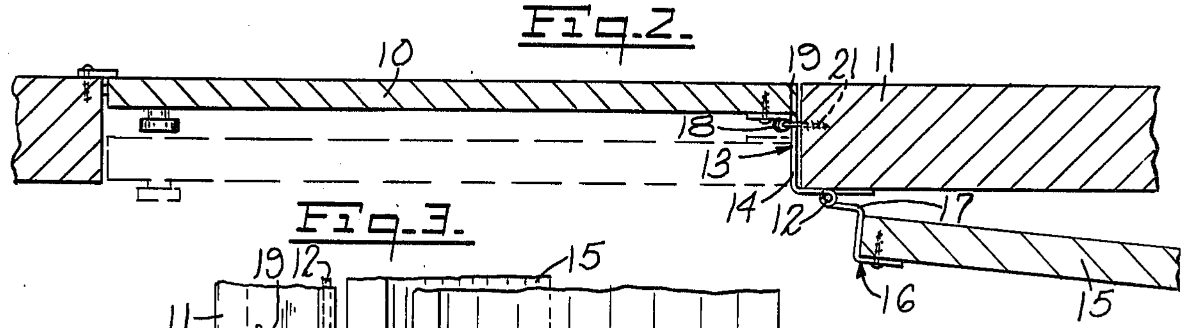
Fig. 3.
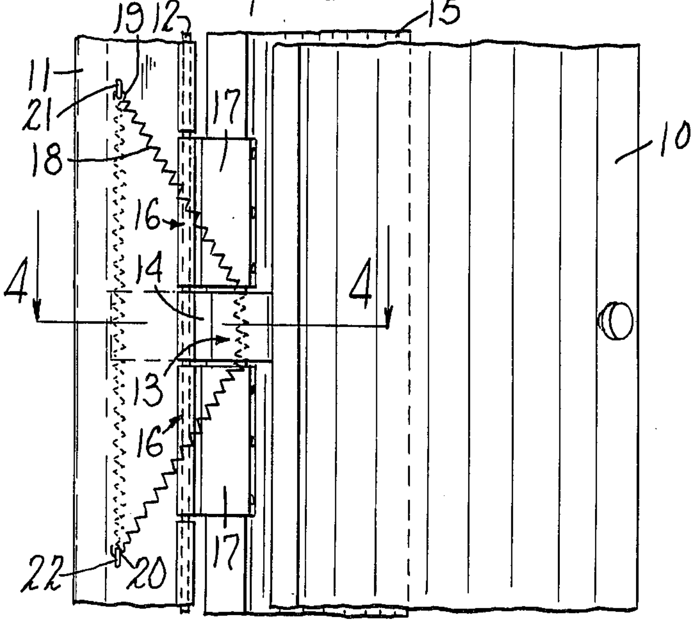

DOOR RETURN APPARATUS

BACKGROUND OF THE INVENTION

1. Field of the Invention

This invention relates to automatic door return or closing apparatus.

2. Description of the Prior Art

Ordinarily, a door return or closing apparatus is mounted on a door frame, and is secured to the door to draw the door closed. Where the door rotates radially around a fixed pivot point, such an apparatus may advantageously be employed. However, where the door's pivot is offset from the plane of the door, such an arrangement usually requires a complicated and expensive mechanism. Such doors are often found in camping trailers having both an inner and outer door both swung on the same pivot. The pivot is located proximate the outer door and the inner door spaced therefrom by an elongated hinge arm. When the inner door is rotated, the plane of the door changes orientation, but not around a fixed point. The return device would be required to accommodate the changing location of the plane's pivot.

Furthermore, in doors for camping trailers it is often desirable to open the doors a full 180 degrees to secure them to the trailer wall. Return apparatus capable also of accommodating such an opening is also expensive and complicated.

The present invention provides an inexpensive door return device for closing or returning a door hung on a hinge pivot displaced from the surface of the door, and for allowing the door to open a full 180 degrees.

SUMMARY OF THE INVENTION

In brief, the invention provides apparatus for returning and closing a door including a hinge arm extending from the door to the pivot offset therefrom, and an elongated resilient member engages the arm and is anchored at both ends to the door frame. In one embodiment, the arm extends from the hinge pivot to the door spaced from the pivot. When the door is opened, the arm extends the resilient member. When the door is released, the resilient member, under tension, urges the door closed.

In a second embodiment, the arm engaging the resilient member extends from the surface of the door.

It is an object of the invention to provide a new and improved apparatus for automatically returning or closing an open door.

It is a further object of the invention to provide a door return apparatus for closing or returning a door swung on a hinge pivot displaced from the surface of the door.

It is yet another object to provide a door return apparatus that permits the door to open a full 180 degrees.

BRIEF DESCRIPTION OF THE DRAWINGS

The features of the invention which are believed to be novel are particularly pointed out and distinctly claimed in the concluding portion of this specification. However, the invention both as to its organization and operation, together with further objects and advantages thereof, may best be appreciated by reference to the following detailed description taken in conjunction with the drawings in which:

FIG. 1 is a front elevational view of a doorway including a door return apparatus embodying the invention;

FIG. 2 is a section taken along line 2—2 in FIG. 1;

FIG. 3 is a view taken along line 3—3 in FIG. 1;

DETAILED DESCRIPTION OF THE PREFERRED EMBODIMENTS

Figure 4:
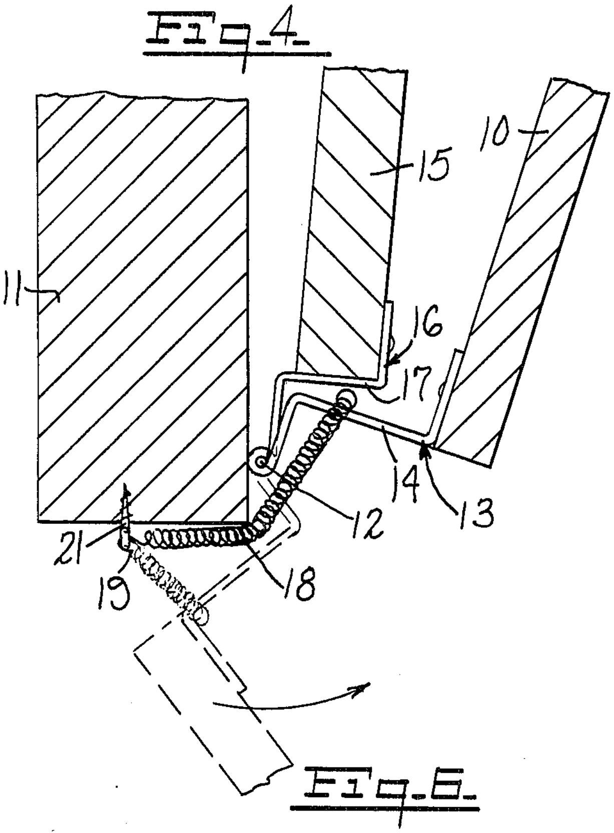
FIG. 4 is a view taken along line 4—4 in FIG. 3.

As exemplified in FIGS. 1 and 2, the invention may be used in conjunction with a door 10 hung in a door frame 11 around pivot pin 12. The invention is particularly useful in connection with a door in which the pivot is offset from the plane of the door by means of a hinge 13 having an arm 14. Such door hanging arrangements are often found in, for example, campers or camping trailers having an outer door 15 hinged to the same pivot pin 12 by a hinge 16 having a short arm 17.

In accordance with the invention, an elongated resilient member 18 is provided having ends 19 and 20 anchored at 21 and 22 to door frame 11 substantially above and below arm 14. Resilient member 18 is situated over and engages arm 14 when the door is closed, so that when door 10 is open, as shown in FIG. 3, member 18 is extended under tension as shown in FIG. 4. When the door is released, resilient member 18 returns arm 14 and door 10 to the original closed position.

Resilient member 18 may comprise, for example, a spring or other resilient material.

Figure 5:
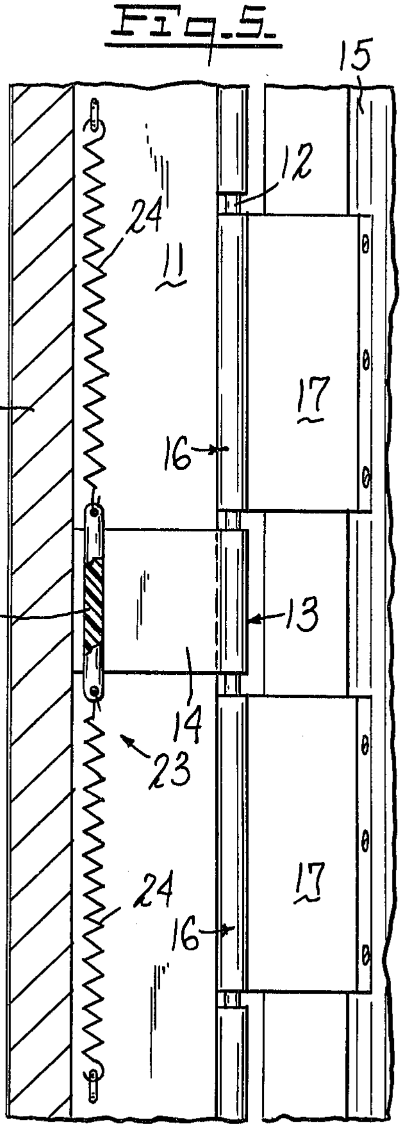
FIG. 5 is a front elevational view of a modification of the return apparatus shown in FIGS. 1 through 4.

With reference to FIG. 5, a modified return member 23 is connected between anchors 21 and 22 passing over and engaging arm 14. Return member 23 includes resilient portions 24 and an intermediate portion 25. The resilient portions may be spring members, and the intermediate portions may be formed of hard rubber. The intermediate portion prevents the return member 23 from binding on the arm 14.

Figure 6:
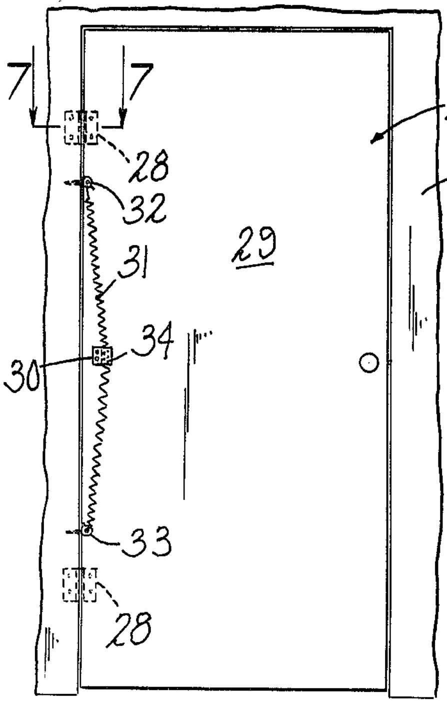
FIG. 6 is a front view of a second embodiment according to the invention.
Figure 7:
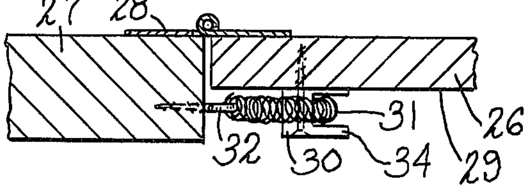
FIG. 7 is a view taken along line 7—7 in FIG. 6.
Figure 8:
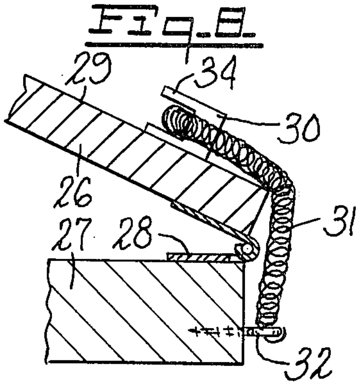
FIG. 8 is a view as in FIG. 7 in which the door is open.

With reference to FIG. 6, a second embodiment includes a door 26 hinged to door frame 27 by hinges 28. Extending from the inside surface 29 of door 26 is an arm 30. An elongated resilient member 31 is anchored to door frame 27 substantially above and below the level of the arm 30 by anchors 32 and 33. Intermediate the anchors the resilient member 31 extends over and engages arm 30 so that when door 26 is open, the resilient member 31 is extended. When door 26 is released, resilient member 31 returns the door closed.

Arm 30 may be formed with a lip 34 to prevent member 31 from slipping therefrom.

Resilient members 18, 24 and 31 may respectively comprise, for example, a spring. Anchors 21, 22, 32 and 33 may comprise eyelets engaging the door frame, the ends of the respective resilient members engaging the apertures in the eyelets.

Although the first embodiment has been disclosed as being particularly useful with doors of camping trailers, it may be used in conjunction with any door swung on a hinge having an arm 14 sufficiently elongated to permit the resilient member to pass thereover. The second embodiment may also be used in conjunction with doors having an offset hinge pivot.

It may thus be seen that the objects of the invention set forth above as well as those made apparent are beneficially attained. While preferred embodiments of the invention have been set forth for purposes of disclosure, other embodiments and modifications of the disclosed embodiments of the invention may be derived by others skilled in the art. Accordingly, the appended claims are intended to cover all embodiments and applications of the invention and reversals thereof which do not depart from the spirit and scope of the invention.

What is claimed is:

1. An arrangement for closing a door having an edge hinged to a door frame which permits the door to swing open to as much as one hundred eighty degrees, said arrangement causing the door to close when it is opened to any position up to one hundred eighty degrees, said arrangement comprising an arm extending from the plane of said door and elongated resilient means having ends fixed to the door frame and running substantially along the hinged edge of the door, said resilient means engaging said arm intermediate said ends so that as the door is opened said arm progressively extends said resilient means.

2. A device as recited in claim 1 wherein said door is hung by means of a hinge having a hinge pivot, said pivot being spaced apart from the plane of said door, said arm comprising the hinge arm supporting said door on said pivot.

3. A device as recited in claim 1 wherein said arm includes a lip for engaging said resilient means.

4. A device as recited in claim 1 wherein said resilient means includes a non-resilient member for engaging said arm.

5. A device as recited in claim 1 in which said resilient means comprises a spring having ends fixed to the door frame substantially spaced apart from said arm.

6. In combination with a door frame and a door having an edge hinged thereto, the arrangement for causing the closing of the door which permits the door to swing open up to as much as one hundred eighty degrees, said arrangement causing the door to close when it is opened to any position up to one hundred eighty degrees, said arrangement comprising an arm extending from the plane of said door and elongated resilient means having ends fixed to the door frame substantially spaced apart from said arm and running substantially along the hinged edge of the door, said resilient means intermediate said ends engaging said arm so that as the door is opened, said resilient means is progressively extended.

7. The combination as recited in claim 6 in which said door is hung by means of a hinge having a hinge pivot, said hinge pivot being spaced apart from the plane of said door, said arm comprising the hinge arm supporting said door on said pivot.

8. The combination as recited in claim 6 in which said resilient means includes a non-resilient member for engaging said arm.

* * * * *